(12) United States Patent
Martinez et al.

(10) Patent No.: US 9,009,454 B2
(45) Date of Patent: Apr. 14, 2015

(54) SECURE OPERATING SYSTEM LOADER

(75) Inventors: Juan I. Martinez, Tomball, TX (US); William P. Swaney, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2511 days.

(21) Appl. No.: 11/716,189

(22) Filed: Mar. 9, 2007

(65) Prior Publication Data

US 2008/0222718 A1     Sep. 11, 2008

(51) Int. Cl.
| | |
|---|---|
| G06F 15/177 | (2006.01) |
| G06G 7/04 | (2006.01) |
| H04L 9/32 | (2006.01) |
| G06F 21/57 | (2013.01) |

(52) U.S. Cl.
CPC ............ *H04L 9/3271* (2013.01); *G06F 21/575* (2013.01)

(58) Field of Classification Search
USPC .............................................................. 713/2
See application file for complete search history.

(56) References Cited

U.S. PATENT DOCUMENTS

| | | | | |
|---|---|---|---|---|
| 6,038,632 | A  * | 3/2000 | Yamazaki et al. | 710/260 |
| 6,272,629 | B1 * | 8/2001 | Stewart | 713/2 |
| 6,389,539 | B1 * | 5/2002 | Hamilton, II et al. | 726/21 |
| 6,401,198 | B1 * | 6/2002 | Harmer et al. | 713/1 |
| 6,684,326 | B1 * | 1/2004 | Cromer et al. | 713/2 |
| 7,500,093 | B2 * | 3/2009 | Makita | 713/2 |
| 2002/0166072 | A1 * | 11/2002 | Cromer et al. | 713/202 |

* cited by examiner

*Primary Examiner* — Kim Huynh
*Assistant Examiner* — Eric Chang
(74) *Attorney, Agent, or Firm* — Caven & Aghevli, LLC

(57) ABSTRACT

In one embodiment a computing device comprises a processor, a memory module coupled to the process and comprising logic instructions stored in a computer readable medium which, when executed, configure the processor to initiate boot operations in a computing device, present an authentication challenge when authentication is required to boot the computing device, continue boot operations in response to a successful response to the authentication challenge, and invoke an error routine in response to an unsuccessful response to the authentication challenge.

3 Claims, 2 Drawing Sheets

SECURE OPERATING SYSTEM LOADER

BACKGROUND

Computer systems may be targeted for unauthorized access to information that resides on the computer system. Some recovery techniques enable users to generate a backup of system data, which may result in a security risk to the date that resides on the computer system.

DETAILED DESCRIPTION

Figure 1:
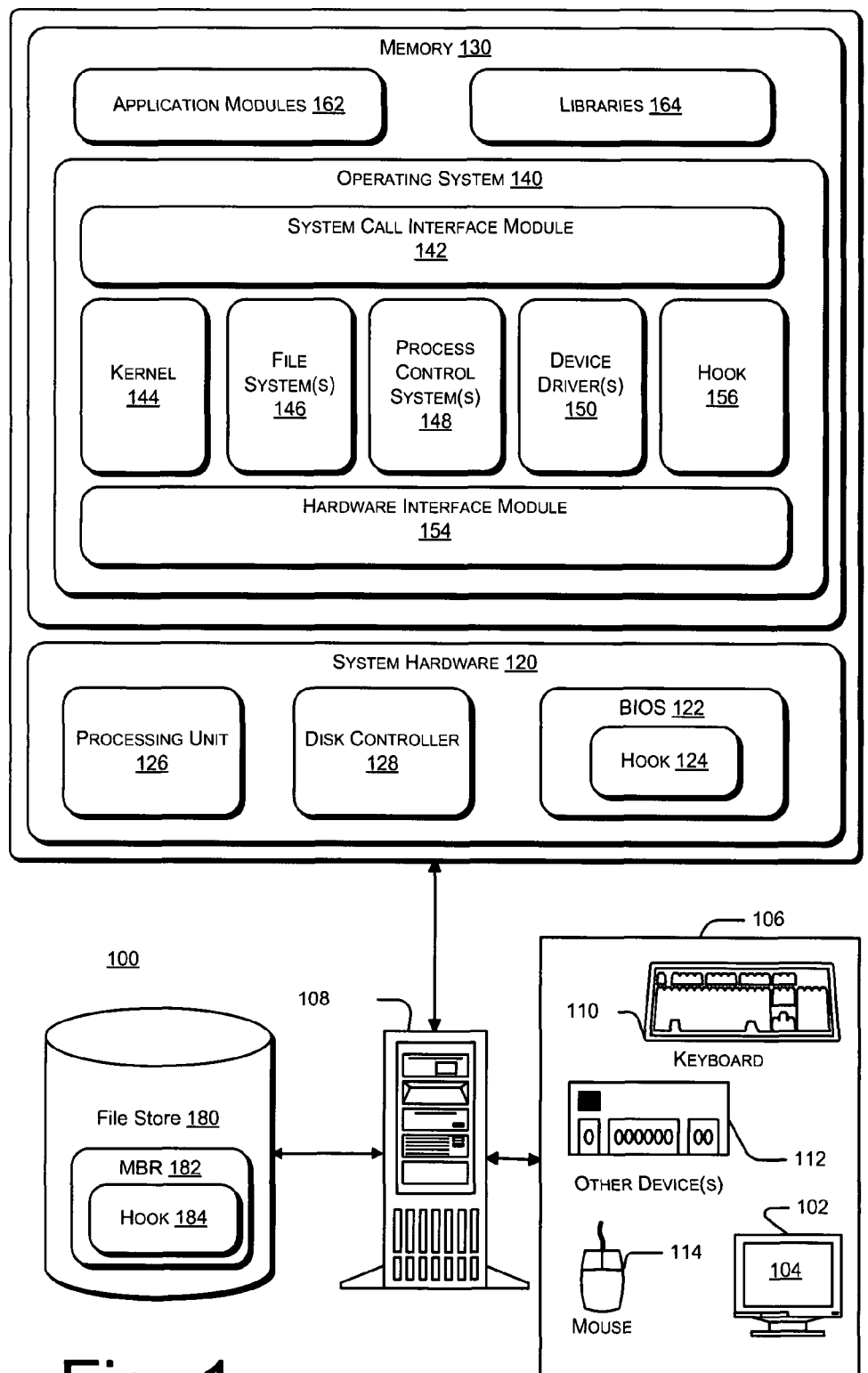
FIG. 1 is a schematic illustration of one embodiment of a computer system adapted to implement a secure operating system loader, according to an embodiment.

FIG. 1 is a schematic illustration of one embodiment of a computer system adapted to implement a secure operating system loader, according to an embodiment. In the illustrated embodiment, system 100 may be embodied as a hand-held or stationary device for accessing the Internet, a desktop PCs, notebook computer, personal digital assistant, or any other processing devices that have a basic input/output system (BIOS) or equivalent.

The computing system 100 includes a computer 108 and one or more accompanying input/output devices 106, which may include a display 102 having a screen 104, a keyboard 110, other I/O device(s) 112, and a mouse 114. The other device(s) 112 may include, for example, a touch screen, a voice-activated input device, a track ball, and any other device that allows the system 100 to receive input from a developer and/or a user. The computer 108 includes system hardware 120 including a processing unit 126, a disk controller 128, and random access memory and/or read-only memory 130.

A file store 180 is communicatively connected to computer 108. File store 180 may be internal such as, e.g., one or more hard drives, or external such as, e.g., one or more external hard drives, network attached storage, or a separate storage network. File store 180 comprises a master boot record 182. In some embodiments, the MBR may be a dedicated sector or sectors of the file store 180. For example, in some computer systems the master boot record is the first sector of a data storage device such as on the hard disk.

Memory 130 includes an operating system 140 for managing operations of computer 108. In one embodiment, operating system 140 includes a hardware interface module 154 that provides an interface to system hardware 120. In addition, operating system 140 includes a kernel 144, one or more file systems 146 that manage files used in the operation of computer 108 and a process control subsystem 148 that manages processes executing on computer 108. Operating system 140 further includes one or more device drivers 150 and a system call interface module 142 that provides an interface between the operating system 140 and one or more application modules 162 and/or libraries 164. The various device drivers 150 interface with and generally control the hardware installed in the computing system 100.

In operation, one or more application modules 162 and/or libraries 164 executing on computer 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware interface module 154 to interface with the system hardware 120. The operating system kernel 144 can be generally considered as one or more software modules that are responsible for performing many operating system functions.

The particular embodiment of operating system 140 is not critical to the subject matter described herein. Operating system 140 may be embodied as a UNIX operating system or any derivative thereof (e.g., Linux, Solaris, etc.), a Windows® brand operating system, or any other operating system.

Computing system 100 further includes a basic input/output system (BIOS) 160. In one embodiment, BIOS 122 may be implemented in flash memory and may comprise a power-on self-test (POST) module for performing system initialization and tests. In operation, when activation of computing system 100 begins processing unit 126 accesses BIOS 122 and shadows the instructions of BIOS 122, such as power-on self-test module, into operating memory. Processor 126 then executes power-on self-test operations to implement POST processing.

Figure 2:
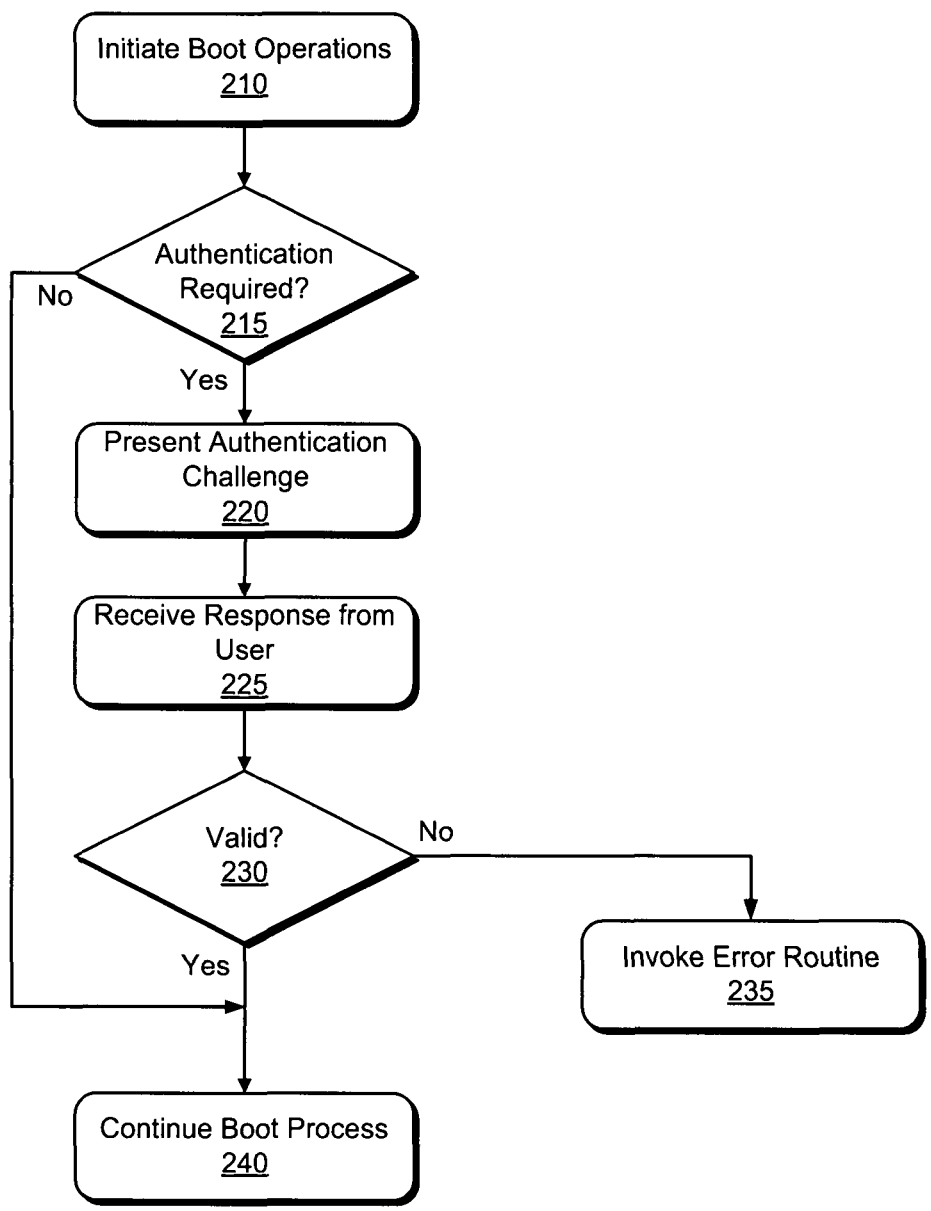
FIG. 2 is a flowchart illustrating operations in one embodiment of implementing a secure operating system loader, according to an embodiment.

In some embodiments, computer system 100 is adapted to implement a secure operating system loader. FIG. 2 is a flowchart illustrating operations in one embodiment of implementing a secure operating system loader. The operations depicted in FIG. 2 may be embodied as logic instructions on a computer-readable medium which may be loaded into the operating memory of the computer system and, when executed by the processing unit 126, configure the computer to implement a secure operating system loader. In one embodiment the logic instructions may be invoked from a hook 124 in the basic input/output system 122 of the computer system 100. In another embodiment the logic instructions may be invoked from a hook 184 in the master boot record 182. The hook 124 (or 184) may trap an interrupt such as, e.g., an Int15h BIOS interrupt service.

In other embodiments the logic instructions may be invoked from another location in the boot vector including, for example, a hook 156 in the operating system 140 or in the boot loader. For example, in some embodiments operating system 140 may represent a system restore operating system which may be used to boot computer system 100 when the primary operating system crashes or the computer system 100 otherwise fails.

In one embodiment, the operations of FIG. 2 may be implemented during the boot up process of the computer system 100. The operations of FIG. 2 determine whether authentication is required to boot the computer system 100 and, if so, implement an authentication process. If the authentication is successful, then the computer system 100 is permitted to continue boot operations. If authentication fails, then an error routine is invoked.

Referring to FIG. 2, at operation 210, boot operations are initiated on computer system 100. For example, the system BIOS 122 may initiate operations to boot the computer system 100. At operation 215 it is determined whether authentication is required. In some embodiments the computer system 100 may be configured with a parameter stored in a suitable memory location (e.g., a register) that indicates whether authentication is required. In other embodiments, authentication may always be required to boot the computer. For example, if the operating system 140 is a system restore operating system, then authentication may be required.

If, at operation 215, authentication is not required, then control passes to operation 240 and the boot process is continued in accord with normal operations. By contrast, if authentication is required, then control passes to operation 220 and an authentication challenge is presented. In some embodiments the authentication challenge may include requesting a password, personal information, a product key, or another identifier. In other embodiments the authentication challenge may require a user to connect a device such as, e.g., a flash memory that stores an authentication key. The authentication challenge may be presented to a user via the monitor 102. At operation 225 a response is received from the user. For example, a user may enter a response to the authentication challenge via one of the input/output devices 106.

If, at operation 230, the response is valid, then control passes to operation 240 and the boot process is continued in accordance with normal operations. By contrast, if at operation 230 the response is invalid, then control passes to operation 235 and an error routine is invoked.

In some embodiments the error routine may comprise presenting an indication that the authentication response was invalid, e.g., by presenting a response on the monitor 102. In some embodiments, the error routine may also implement steps to secure data stored on the file store 180 of computer system 100. For example, the error routine may block input/output operations directed to file store 100, e.g., by disabling the disk controller(s) 128 that control access to file store 180. Further, in some embodiments the error routine may prevent the complete loading of the operating system 140 in the memory 140 of computer system 100.

Thus, the operations of FIG. 2 permit the computer system 100 to require authentication in order to complete a boot process, and to deny access to data stored on the computer's file store in the event the authentication process fails.

As noted above, the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method comprising:
   initiating boot operations from a system restore operating system in a computing device;
   determining whether authentication is required to boot the computing device;
   presenting an authentication challenge only if the authentication is determined to be required to boot the computing device, wherein presenting the authentication challenge comprises initiating the authentication challenge from the system restore operating system;
   continuing boot operations in response to a successful response to the authentication challenge; and
   invoking an error routine in response to an unsuccessful response to the authentication challenge.

2. A computing device, comprising:
   a processor;
   a memory module coupled to the processor and comprising logic instructions stored in a computer readable medium which, when executed, configure the processor to:
      initiate boot operations from a system restore operating system in a computing device;
      determine whether authentication is required to boot the computing device;
      present an authentication challenge only if the authentication is determined to be required to boot the computing device;
      initiate the authentication challenge from the system restore operating system;
      continue boot operations in response to a successful response to the authentication challenge; and
      invoke an error routine in response to an unsuccessful response to the authentication challenge.

3. A computer program product comprising logic instructions stored in a computer readable medium which, when executed, configure a processor to:
   initiate boot operations from a system restore operating system in a computing device;
   determine whether authentication is required to boot the computing device;
   present an authentication challenge only if the authentication is determined to be required to boot the computing device;
   initiate the authentication challenge from the system restore operating system;
   continue boot operations in response to a successful response to the authentication challenge; and
   invoke an error routine in response to an unsuccessful response to the authentication challenge.

* * * * *